United States Patent
Vinjanampati et al.

(10) Patent No.: US 10,787,272 B2
(45) Date of Patent: Sep. 29, 2020

(54) ACTUATOR WITH VIBRATION ATTENUATION USING VISCO ELASTIC MATERIALS

(71) Applicant: Hamilton Sundstrand Corporation, Charlotte, NC (US)

(72) Inventors: Pavan Kumar Vinjanampati, Karnataka (IN); Rajasekaran Janakiraman, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 217 days.

(21) Appl. No.: 15/856,761

(22) Filed: Dec. 28, 2017

(65) Prior Publication Data
US 2019/0118959 A1 Apr. 25, 2019

(30) Foreign Application Priority Data
Oct. 20, 2017 (IN) .............................. 201711037206

(51) Int. Cl.
| | | |
|---|---|---|
| B64D 29/06 | (2006.01) | |
| F16F 7/08 | (2006.01) | |
| F16F 7/09 | (2006.01) | |
| F16F 7/00 | (2006.01) | |
| F16F 9/00 | (2006.01) | |
| F15B 15/22 | (2006.01) | |

(52) U.S. Cl.
CPC ................ *B64D 29/06* (2013.01); *F16F 7/00* (2013.01); *F16F 7/087* (2013.01); *F16F 7/09* (2013.01); *F16F 9/003* (2013.01); *F15B 15/22* (2013.01)

(58) Field of Classification Search
CPC .............. F16F 7/00; F16F 9/003; B64D 29/06
See application file for complete search history.

(56) References Cited

U.S. PATENT DOCUMENTS

| | | | | |
|---|---|---|---|---|
| 3,294,391 A | * | 12/1966 | Smith ..................... | F16F 9/003 267/219 |
| 4,296,839 A | * | 10/1981 | Peller ....................... | F16F 9/30 188/378 |
| 5,257,680 A | * | 11/1993 | Corcoran .................. | F16F 7/02 188/129 |
| 5,501,434 A | | 3/1996 | McGuire | |
| 5,965,249 A | | 10/1999 | Sutton et al. | |
| 6,241,062 B1 | * | 6/2001 | Enright ..................... | F16F 7/00 188/18 A |
| 2016/0229546 A1 | * | 8/2016 | Chavignier ............ | B64D 29/06 |
| 2016/0290428 A1 | | 10/2016 | Beltran et al. | |

FOREIGN PATENT DOCUMENTS

| | | |
|---|---|---|
| EP | 0186794 B1 | 7/1986 |
| EP | 0774595 A2 | 5/1997 |
| FR | 3037039 A1 | 12/2016 |

OTHER PUBLICATIONS

Search Report dated Feb. 20, 2019 in EP Application No. EP18200954, 9 pages.

* cited by examiner

*Primary Examiner* — Richard R. Green
*Assistant Examiner* — William L Gmoser
(74) *Attorney, Agent, or Firm* — Cantor Colburn LLP

(57) ABSTRACT

An actuator is provided for an aircraft engine and includes a tubular base layer and a visco-elastic layer adhesively disposed on the tubular base layer.

13 Claims, 3 Drawing Sheets

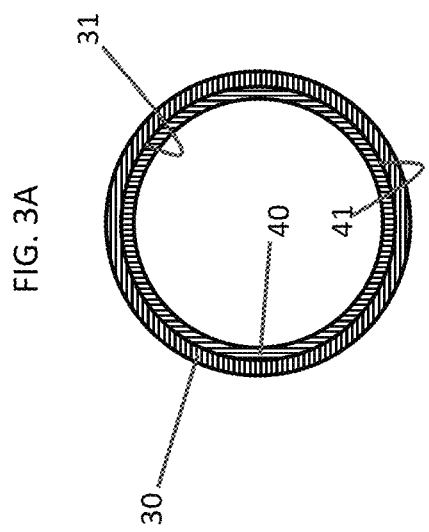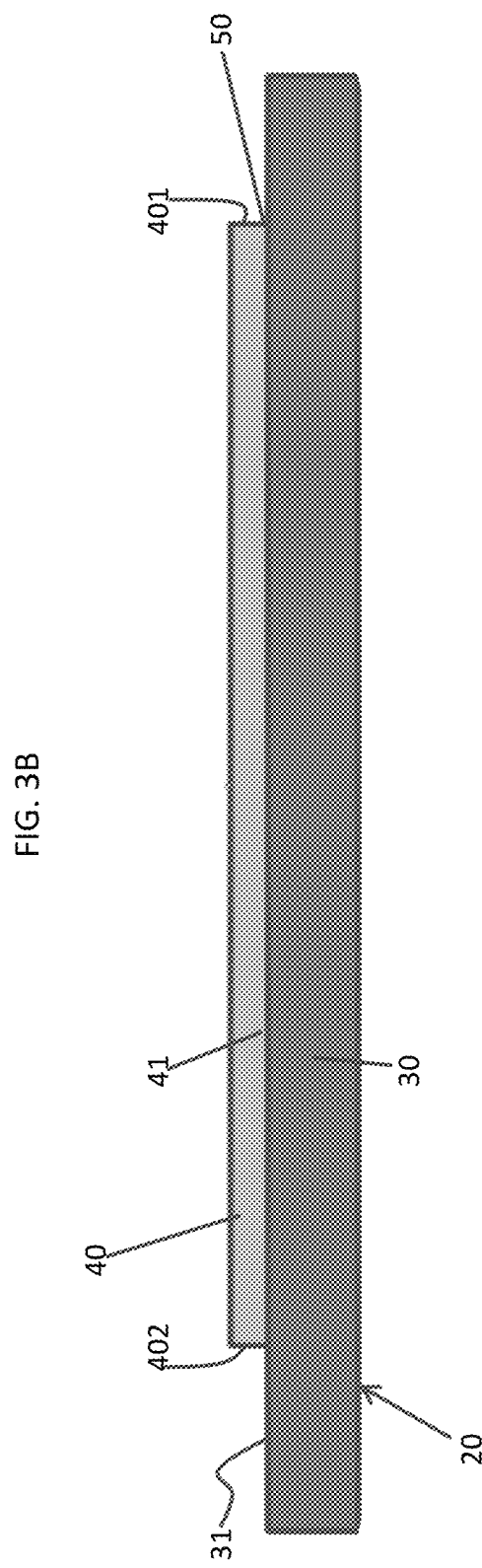

ACTUATOR WITH VIBRATION ATTENUATION USING VISCO ELASTIC MATERIALS

CROSS-REFERENCE TO RELATED APPLICATIONS

This application claims the benefit of Indian Patent Application Number 201711037206, filed Oct. 20, 2017, which is incorporated herein by reference in its entirety.

BACKGROUND

The following description relates to actuators and, more specifically, to actuators with visco-elastic materials on piston rod internal diameters for vibration attenuation.

Actuation systems in aircraft engines include actuators that are operable disposed between an engine case and an engine cowl door. In that location, the actuators are subject to engine vibrations that can reach and exceed 20 Gs. The actuators' natural frequencies generally fall in the engine operating range and hence would resonate leading to high responses due to high excitation levels. As such, the actuators need to be able to sustain these vibrations in tests.

Actuators in actuation systems have exhibited vibration test failures that led to redesigns and requests for test deviation or test level reductions. The various developments, qualification and risk mitigation tests performed on these actuators have also indicated a lack of damping capability. Redesign efforts to further improve designs to meet certain damping ratio goals have resulted in relatively significant weight additions as well.

BRIEF DESCRIPTION

According to an aspect of the disclosure, an actuator is provided for an aircraft engine and includes a tubular base layer and a visco-elastic layer adhesively disposed on the tubular base layer.

In accordance with additional or alternative embodiments, the tubular base layer extends between an actuator engine case end and an actuator cowl door end.

In accordance with additional or alternative embodiments, the visco-elastic layer has opposite axial ends respectively displaced inwardly from the actuator engine case end and the actuator cowl door end.

In accordance with additional or alternative embodiments, the visco-elastic layer is adhesively disposed on an interior facing surface of the tubular base layer.

In accordance with additional or alternative embodiments, the tubular base layer includes metallic material.

In accordance with additional or alternative embodiments, the visco-elastic material is selected in accordance with at least a vibration frequency of interest.

In accordance with additional or alternative embodiments, adhesive is interposed between the tubular base layer and the visco-elastic layer.

In accordance with additional or alternative embodiments, a constrained layer is adhered to the visco-elastic layer.

According to another aspect of the disclosure, an aircraft engine assembly is provided and includes an engine case, a cowl door and an actuator. The actuator has an engine case end coupled to the engine case and a cowl door end coupled to the cowl door and includes a tubular base layer and a visco-elastic layer disposed on the tubular base layer and selected in accordance with at least a vibration frequency of interest.

In accordance with additional or alternative embodiments, the tubular base layer extends between the engine case end and the cowl door end.

In accordance with additional or alternative embodiments, the visco-elastic layer has opposite axial ends respectively displaced inwardly from the engine case end and the cowl door end.

In accordance with additional or alternative embodiments, the visco-elastic layer is adhesively disposed on an interior facing surface of the tubular base layer.

In accordance with additional or alternative embodiments, the tubular base layer includes metallic material.

In accordance with additional or alternative embodiments, adhesive is interposed between the tubular base layer and the visco-elastic layer.

In accordance with additional or alternative embodiments, a constrained layer is adhered to an interior facing surface of the visco-elastic layer.

According to yet another aspect of the disclosure, an aircraft engine assembly is provided and includes an engine case, a cowl door and an actuator. The actuator has an engine case end coupled to the engine case and a cowl door end coupled to the cowl door and includes a tubular base layer extending between the engine case end and the cowl door end, a constrained layer and a visco-elastic layer adhesively interposed between an interior facing surface of the tubular base layer and an exterior facing surface of the constrained layer. The visco-elastic layer is selected in accordance with at least a vibration frequency of interest.

In accordance with additional or alternative embodiments, each of the visco-elastic layer and the constrained layer has opposite axial ends respectively displaced inwardly from the engine case end and the cowl door end.

In accordance with additional or alternative embodiments, the tubular base layer includes metallic material.

In accordance with additional or alternative embodiments, the constrained layer includes metallic material.

In accordance with additional or alternative embodiments, first adhesive is radially interposed between the interior facing surface of the tubular base layer and the visco-elastic layer and second adhesive is radially interposed between the visco-elastic layer and the exterior facing surface of the constrained layer.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3A is an enlarged axial schematic view of the actuator of FIG. 2 in accordance with embodiments;

FIG. 3B is an enlarged side schematic view of the actuator of FIG. 2 in accordance with embodiments;

These and other advantages and features will become more apparent from the following description taken in conjunction with the drawings.

DETAILED DESCRIPTION

As will be described below, an actuator is provided with damping capability from the introduction of visco-elastic materials on an internal diameter of a piston rod thereof. The actuator includes a visco-elastic material damping sheet with or without a constrained layer that is stuck or glued to the internal diameter of the piston rod. With or without the constrained layer, the visco-elastic material damping sheet introduces adequate damping to reduce the high-vibration frequency responses and to help the actuator pass qualification tests without deviations or failures.

With reference to FIGS. 1-3A and 3B, an aircraft engine assembly 10 is provided and includes an engine case 11, a nacelle or cowl door (hereinafter referred to as a "cowl door") 12, an actuator 13 and a hold open rod (HOR) 14. The engine case 11 accommodates an engine which can be used to generate motive power for an aircraft from the combustion of fuel. The cowl door 12 is a component of an engine nacelle that supports the engine and the engine case 11. The cowl door 12 can be closed as shown in the left hand side image of FIG. 1 or opened as shown in the right hand side image of FIG. 1 to permit access to the interior of the engine nacelle for maintenance requirements. The actuator 13 is interposed between the engine case 11 and the cowl door 12 and participates in the governance of when and by what degree the cowl door 12 opens and closes (i.e., by assuming a closed or stowed condition or position as shown in the left hand side image of FIG. 1 or by assuming a deploy or open condition or position as shown in the right hand side image of FIG. 1). The HOR 14 provides support for the cowl door 12 in the open condition.

In the stowed position, the actuator 13 may be subjected to vibrations in multiple directions and at various magnitudes. For example, as the engine within the engine case 11 operates, the engine case 11 transfers engine vibrations into the actuator 13. These engine vibrations can have a magnitude of up to 20 Gs. The actuator 13 is thus designed to damp and sustain these vibrations as will be described below.

Figure 1:
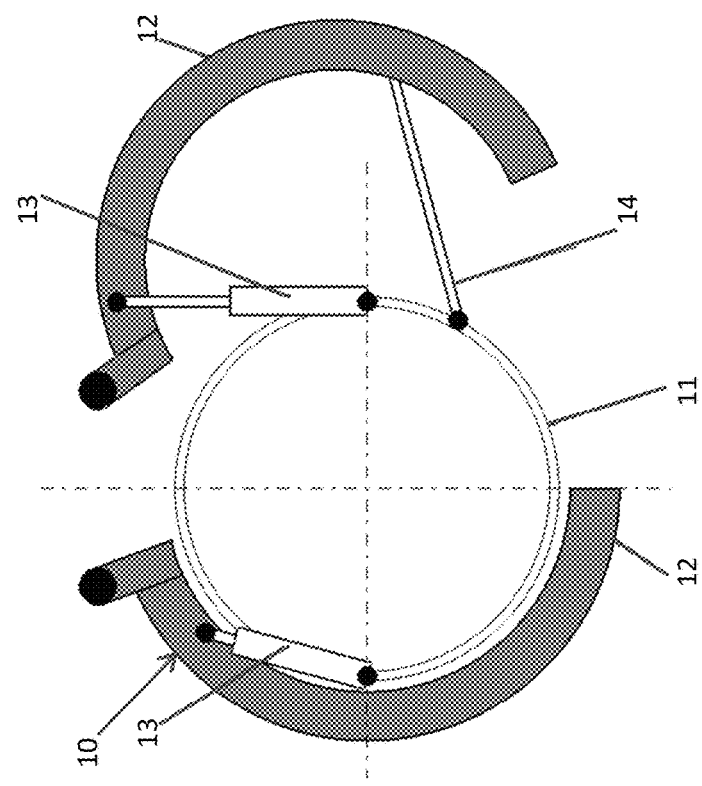
FIG. 1 is a schematic illustration of an aircraft engine assembly in accordance with embodiments.
Figure 2:
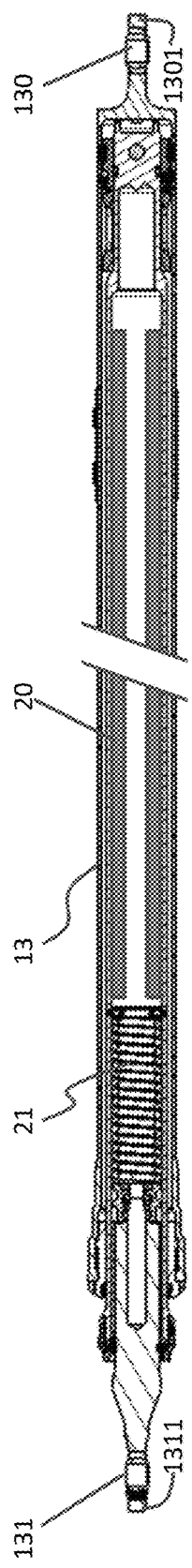
FIG. 2 is a cross-sectional view of an actuator for the aircraft engine assembly of FIG. 1.

As shown in FIGS. 2, 3A and 3B, the actuator 13 extends along a longitudinal axis and has an engine case end 130 at one terminal end 1301 thereof and a cowl door end 131 at an opposite terminal end 1311 thereof. The engine case end 130 is operably coupled to the engine case 11 and the cowl door end 131 is operably coupled to the cowl door 12. The actuator 13 includes a piston rod 20 and an elastic element 21. The piston rod 20 is anchored to the engine case end 130 and slidably coupled to the cowl door end 131. The elastic element 21 may be provided as a compression spring and is anchored at opposite ends thereof to the piston rod 20 and the cowl door end 131. In this way, as the actuator 13 is subject to vibrations along the longitudinal axis, the piston rod 20 slides relative to the cowl door end 131 and the elastic element 21 cooperatively reacts to reduce the sliding to thereby dampen the vibrations.

In accordance with embodiments, an interior surface of the piston rod 20 may include or be provided as a tubular base layer 30 that extends substantially between the engine case end 130 and the cowl door end 131 and the actuator 13 may further include a visco-elastic material (VEM) layer 40, which is disposed or adhesively disposed on an interior facing surface 31 of the tubular base layer 30, and in some cases an adhesive 50, which is radially interposed between the interior facing surface 31 and an exterior facing surface 41 of the VEM layer 40 to secure the VEM layer 40 to the tubular base layer 30.

The tubular base layer 30 may be formed of one or more metallic materials and may be substantially cylindrical. The VEM layer 40 may be substantially cylindrical (see FIG. 3A) or may extend about a portion of the interior facing surface 31 (i.e., the VEM layer 40 may be provided as a circumferential segment along the portion of the interior facing surface 31). In any case, the VEM layer 40 has opposite axial ends 401 and 402 that are respectively displaced inwardly from the engine case end 130 and the cowl door end 131 and a material of the VEM 40 may be selected in accordance with at least a vibration frequency of interest.

When the actuator 13 flexes during vibration, energy is dissipated as a result of extension and compression of the VEM layer 40 under flexural stress from the tubular base structure 30. This phenomenon will hereinafter be referred to as "free layer damping." Design of such free layer damping involves the design and selection of the material of the VEM layer 40 as well as the design of its thickness and other dimensional characteristics. As a general matter, as noted above, the material of the VEM layer 40 may be selected based on at least a frequency of interest to which the actuator 13 is exposed and an operating temperature to which the actuator 13 is exposed.

In accordance with embodiments, nomographs of various materials available for the VEM layer 40 can be studied so that a suitable material can be selected for a given application. As used herein, it is to be understood that nomographs of the various materials available for the VEM layer 40 provide details of shear modulus and loss factor characteristics of those various materials across frequency ranges and in different temperature zones.

Figure 4A:
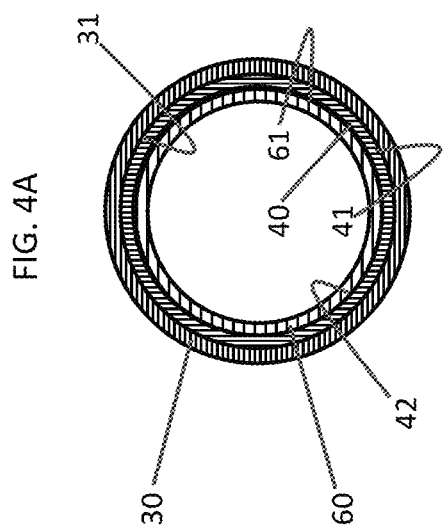
FIG. 4A is an enlarged axial schematic view of the actuator of FIG. 2 in accordance with further embodiments.
Figure 4B:
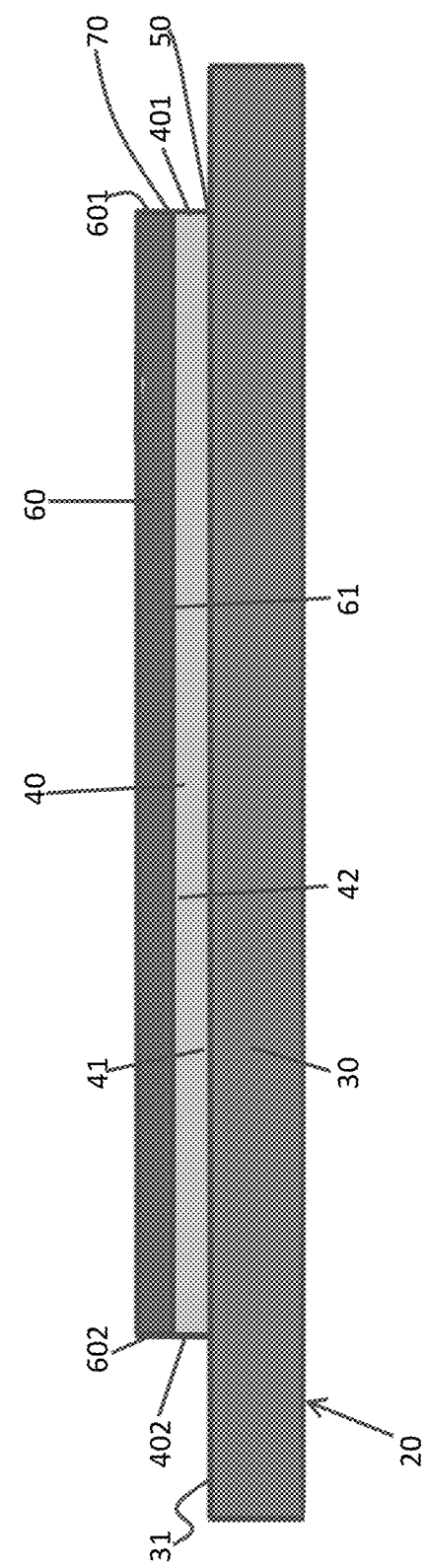
FIG. 4B is an enlarged side schematic view of the actuator of FIG. 2 in accordance with further embodiments.

With continued reference to FIG. 2 and with additional reference to FIGS. 4A and 4B, the actuator 13 may further include the visco-elastic material (VEM) layer 40 disposed or adhesively disposed on the interior facing surface 31 of the tubular base layer 30, a first adhesive 50, a constrained layer 60 and a second adhesive 70. The first adhesive 50 is radially interposed between the interior facing surface 31 and the exterior facing surface 41 of the VEM layer 40 to secure the VEM layer 40 to the tubular base layer 30. The second adhesive 70 is radially interposed between an interior facing surface of the VEM layer 42 and an exterior facing surface 61 of the constrained layer 60.

The tubular base layer 30 and the constrained layer 60 may each be formed of one or more similar or different metallic materials and at least the tubular base layer 30 may be substantially cylindrical. The VEM layer 40 and the constrained layer 60 may each be substantially cylindrical (see FIG. 4A) or may extend about a portion of the interior facing surface 31 (i.e., the VEM layer 40 and the constrained layer 60 may be provided as circumferential segments along the portion of the interior facing surface 31). In any case, the VEM layer 40 and the constrained layer 60 have respectively opposite axial ends 401 and 402 and 601 and 602 that are respectively displaced inwardly from the engine case end 130 and the cowl door end 131. A material of the VEM 40 may be selected in accordance with at least a vibration frequency of interest.

When the actuator 13 flexes during vibration, shear strains develop in the VEM layer 40 and energy is lost through shear deformation of the material of the VEM layer 40 subject to the impact of the constrained layer 60. This phenomenon will hereinafter be referred to as "constrained layer damping." Design of such constrained layer damping involves the design and selection of the material of the VEM layer 40, the design of its thickness and other dimensional characteristics as well as the design and selection of a material of the constrained layer 60 and its thickness and other dimensional characteristics. As a general matter, as noted above, the respective materials of the VEM layer 40 and the constrained layer 60 may be respectively selected based on at least a frequency of interest to which the actuator 13 is exposed and an operating temperature to which the actuator 13 is exposed.

In accordance with embodiments, nomographs of various materials available for the VEM layer 40 can be studied so that a suitable material can be selected for a given application. As used herein, it is to be understood that nomographs of the various materials available for the VEM layer 40 provide details of shear modulus and loss factor characteristics of those various materials across frequency ranges and in different temperature zones.

The viscoelastic material, either as a free layer or with a constrained layer, may be attached to the inner diameter the piston rod of the actuators described herein and thus provides for adequate damping and significantly reduces the high vibration responses of the actuators and furthermore enables the actuators to pass qualification tests without deviations or failures. The viscoelastic material also provides opportunities for weight reduction, improved vibration damping effects, reduced risk of flammability and a shorter product cycle as compared to conventional actuators.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An actuator for an aircraft engine, comprising:
a tubular base layer;
a visco-elastic layer adhesively disposed on the tubular base layer; and
a constrained layer adhered to the visco-elastic layer, wherein:
the tubular base layer extends between an actuator engine case end and an actuator cowl door end at opposite terminal ends thereof,
the tubular base layer and the constrained layer comprise metallic materials, and
each of the visco-elastic layer and the constrained layer has opposite axial ends respectively displaced inwardly by equal respective distances from the actuator engine case end and the actuator cowl door end.

2. The actuator according to claim 1, wherein the visco-elastic layer is adhesively disposed on an interior facing surface of the tubular base layer.

3. The actuator according to claim 1, wherein the tubular base layer and the constrained layer comprise similar metallic materials.

4. The actuator according to claim 1, wherein the visco-elastic material is selected in accordance with at least a vibration frequency of vibration to which the actuator is exposed.

5. The actuator according to claim 1, further comprising adhesive which is radially interposed between an interior facing surface of the tubular base layer and an exterior facing surface of the visco-elastic layer.

6. An aircraft engine assembly, comprising:
an engine case;
a cowl door; and
an actuator comprising, at opposite terminal ends thereof, an engine case end coupled to the engine case, and a cowl door end coupled to the cowl door, the actuator comprising:
a tubular base layer;
a visco-elastic layer disposed on the tubular base layer and selected in accordance with at least a vibration frequency of vibration to which the actuator is exposed; and
a constrained layer adhered to an interior facing surface of the visco-elastic layer,
wherein the tubular base layer and the constrained layer comprise metallic materials and each of the visco-elastic layer and the constrained layer has opposite axial ends respectively displaced inwardly by equal respective distances from the engine case end and the cowl door end.

7. The aircraft engine assembly according to claim 6, wherein the tubular base layer extends between the engine case end and the cowl door end of the opposite terminal ends of the actuator.

8. The aircraft engine assembly according to claim 6, wherein the visco-elastic layer is adhesively disposed on an interior facing surface of the tubular base layer.

9. The aircraft engine assembly according to claim 6, wherein the tubular base layer and the constrained layer comprise similar metallic materials.

10. The aircraft engine assembly according to claim 6, further comprising adhesive interposed between the tubular base layer and the visco-elastic layer.

11. An aircraft engine assembly, comprising:
an engine case;
a cowl door; and
an actuator comprising, at opposite terminal ends thereof, an engine case end, which is configured to be coupled to the engine case, and a cowl door end, which is configured to be coupled to the cowl door, the actuator comprising:
a tubular base layer extending between the engine case end and the cowl door end of the opposite terminal ends of the actuator;
a constrained layer; and
a visco-elastic layer adhesively interposed between an interior facing surface of the tubular base layer and an exterior facing surface of the constrained layer and selected in accordance with at least a vibration frequency of vibration to which the actuator is exposed,
wherein the tubular base layer and the constrained layer comprise metallic materials and each of the visco-elastic layer and the constrained layer has opposite axial ends respectively displaced inwardly by equal respective distances from the engine case end and the cowl door end.

12. The aircraft engine assembly according to claim 11, wherein the tubular base layer and the constrained layer comprise similar metallic materials.

13. The aircraft engine assembly according to claim 11, further comprising:
   first adhesive radially interposed between the interior facing surface of the tubular base layer and an exterior facing surface of the visco-elastic layer; and
   second adhesive radially interposed between an interior facing surface of the visco-elastic layer and the exterior facing surface of the constrained layer.

* * * * *